United States Patent Office 3,440,173
Patented Apr. 22, 1969

3,440,173
FLUORESCENT TERBIUM CHELATES
Richard J. Hovey, Worcester, and Donald O. Hoffman, Sturbridge, Mass., assignors, by mesne assignments, to American Optical Company, Southbridge, Mass., a corporation of Delaware
No Drawing. Filed Dec. 17, 1964, Ser. No. 419,192
Int. Cl. C09k 1/00; F21k 2/00
U.S. Cl. 252—301.2         2 Claims

ABSTRACT OF THE DISCLOSURE

A chemical composition consisting of a terbium chelate wherein the ligand portion is derived from certain derivatives or salicyclic acid and has use and application in surface coatings and paints in which room temperature fluorescence will be achieved.

---

This invention relates to terbium-containing compositions. More particularly, this invention relates to fluorescent terbium-containing compositions. Still more particularly, this invention relates to fluorescent compositions containing chelated terbium, such as compositions, liquid and/or solid, containing chelated terbuim ions together with another material admixed therewith.

It is known that certain chelated terbium-containing compositions, such as terbium tris-dibenzoylamine, exhibit fluorescence and that this property renders such compounds of special commercial interest, particularly in the field of laser applications and development. In other applications, such as in paints or surface coatings and the like, this property of fluorescence is also useful and of interest.

It is an object of this invention to provide novel, fluorescent chelated terbium-containing compositions.

Another object of this invention is to provide chelated terbium-containing compositions having improved fluorescence.

Still another object of this invention in accordance with one embodiment thereof is to provide a method for improving or enhancing the fluorescence of fluorescent, chelated terbium-containing compositions.

Yet another object of this invention in accordance with one embodiment thereof is to provide a method for preparing fluorescent compositions, particularly fluorescent chelated terbium-containing compositions.

Yet another object of this invention is to provide a method of generating fluorescence.

How these and other objects of this invention are accomplished will become apparent in the light of the accompanying disclosure. In at least one embodiment of the practice of this invention at least one of the foregoing objects will be achieved.

In accordance with this invention it has been discovered that special terbium chelates exhibit the property of fluorescence. More particularly, it has been found that the following ligands activate the fluorescence of terbium. The special ligands in accordance with this invention which have been found to activate the fluorescence of terbium include salicylic acid, 5-chlorosalicylic acid, 5-bromosalicylic acid, 5,5′-methylenedisalicylic acid, 2,4-dihydroxybenzoic acid, 2-hydroxy-3-methylbenzoic acid, 2,5-dihydroxybenzoic acid, salicylamide, salicylhydrazide, 2,5-dihydroxy-p-benzenedisulfonic acid dipotassium salt and N-phenylanthranilic acid. Therefore, in accordance with this invention it has been discovered that a composition comprising a terbium chelate wherein the ligand portion of said chelate is derivable from the group consisting of salicylic acid, 5-chlorosalicylic acid, 5-bromosalicylic acid, 5,5′-methylenedisalicylic acid, 2,4-dihydroxybenzoic acid, 2-hydroxy-3-methylbenzoic acid, 2,5-dihydroxybenzoic acid, salicylamide, salicylhydrazide, 2,5-dihydroxy-p-benzenedisulfonic acid dipotassium salt and N-phenylanthranilic acid exhibits fluorescence upon exposure to activating radiation, such as ultra-violet radiation.

Specific fluorescent, chelated terbium compounds in accordance with this invention include such terbium chelates as terbium tris-salicylate, terbium tris-5-bromosalicylate, terbium tris-5-chlorosalicylate, terbium tris-5,5′-methylenedisalicylate, terbium tris-2,4-dihydroxybenzoate, terbium tris-2-hydroxy-3-methylbenzoate, terbium tris - 2,5 - dihydroxybenzoate and terbium tris-N-phenylanthranilate.

Room temperature fluorescence of the above-identified terbium chelates has been observed when such terbium chelates have been dissolved in a solvent particularly a polar solvent. Specific solvents in which fluorescence of the above-identified terbium chelates has been observed when dissolved therein include such polar solvents as methyl alcohol, ethyl alcohol, isopropyl alcohol, glycerine, ethylene glycol, morpholine, dimethylsulfoxide, dimethylaminopropylamine, triethylenetetramine and diethylaminopropylamine. The solvents which are useful in the preparation of fluorescent chelated terbium-containing solutions in accordance with this invention include other alkanols, such as propanol and butanol, and the various cycloalkanols, such as cyclohexanol, and the various ketones, such as acetone, methyl ethyl ketone, diethyl ketone, methyl isobutyl ketone, the various ethers, such as ethyl ether, propyl ether, methyl ethyl ether, ethyl propyl ether, the various esters, such as the esters prepared by reacting the lower molecular weight alkanols in the range $C_1$–$C_8$ with the lower molecular weight aliphatic acids in the range $C_1$–$C_8$, and mixtures of the above-identified solvents, including petroleum solvents, such as petroleum ether.

In addition to a liquid carrier or solvent for the special fluorescent terbium chelates of this invention, carriers or supports for these special terbium chelates may comprise solid materials of a plastic and/or glassy nature. In this connection a terbium chelate in accordance with this invention, specially terbium tris-salicylate, has been incorporated in an amine-hardened epoxy resin. It was observed that the green terbium fluorescence of this composition is most intense just prior to the complete hardening of the epoxy resin. Also, it was observed that the bright green terbium fluorescence of such compositions is best retained when an excess of the amine hardener is employed or when an additional basic substance, such as morpholine, is incorporated therein.

In accordance with another feature of this invention the presence of a Lewis base admixed with the above-identified, special terbium chelates of this invention results in an improved or enhanced fluorescence, the improved or enhanced fluorescence being observable in solutions and in solid compositions containing the special terbium chelates and the Lewis base. The use of a Lewis base to improve or enhance the fluorescence of certain chelated lanthanides is disclosed in copending, coassigned application Ser. No. 364,022, filed Apr. 30, 1964, now abandoned in the name of Marcos Y. Kleinerman. The disclosures of the above-identified application are herein incorporated and made part of this disclosure.

A Lewis base which is useful in accordance with one embodiment of this invention for improving or enhancing the fluorescence of the special terbium chelates herein may be defined as a compound having an unshared electron pair. Of particular interest in the practice of this invention are those Lewis bases which are non-chelating with respect to terbium. Examples of Lewis bases, and which also may be a solvent for the special terbium chelate herein, include dimethylsulfoxide, tri-n-butyl phosphate, pyridine, morpholine, piperidine, 1,8 - p-menthanediamine, diglycidyl ether of Bisphenol A (Dow Epoxy Resin 332) cured with 1,8-p-menthanediamine, triethylamine, tetramethylguanidine, tetramethylammonium hydroxide, triethylenediamine, diethylenetriamine, triethylenetetramine, meta - xylene diamine, 1,3 - butanediamine, tri-n-octyl phosphine oxide, tri-n-butyl phosphine oxide and 2,4-dimethylmorpholine. Other Lewis bases are known and are useful in combination with the special terbium chelates of this invention. Of the Lewis bases, the amines, i.e. those organic compounds which can be considered as derived from ammonia by replacement of one or more of the hydrogen atoms with an organic radical, are particularly useful.

In addition to a liquid carrier or solvent for the special chelated compounds or compositions, the carrier or support for the special chelated terbium compounds or compositions of this invention may comprise solid materials of a plastic and/or glassy nature. For example, terbium tris-salicylate has been incorporated in a solid plastic material, such as Permabond, a blend of synthetic rubber and a thermosetting resin manufactured by Polymer Chemical Company. By dissolving terbium acetate and salicyclic acid in dimethylsulfoxide and adding the resulting solution to partially polymerized Permabond, followed by polymerization of the resulting admixture, such as by heating at a temperature of 110° C. for several hours, concentrations of terbium tris-salicylate in excess of $10^{20}$ molecules/cc. of the resulting fluorescent terbium-containing plastic composition were attained. It was observed that the resulting chelated terbium-containing Permabond plastic material became more strongly fluorescent with increasing hardness of the plastic. Other solid plastic materials, such as epoxy resins and polymerized methacrylate, such as Lucite, are also useful as carriers or supports for the special terbium chelates of this invention.

Further exemplary of the practice of this invention, fluorescent chelated terbium-containing epoxy resins were obtained by dissolving salicylic acid and terbium acetate in an amine hardener, followed by mixing with an epoxy resin.

The fluorescence of compositions containing the special terbium chelates in accordance with this invention is observable by exciting the compositions with a pulse of light of very short duration. The fluorescence of the special chelated terbium compositions of this invention is particularly observable when these compositons are subjected to radiation in the ultra-violet range. When compositions of this invention are used in paints and surface coatings, pulse excitation is not normally used but rather continuous wave excitation is usually employed.

Desirably, the special chelated terbium-containing compositions in accordance with this invention containing a concentration of chelated terbium ions from about $1 \times 10^{-4}$ M up to about 0.5 M, such as in the range $5 \times 10^{-3}$ M to 0.1 M chelated terbium ions. Further, the amounts of Lewis base employed in combination with the special chelated terbium in accordance with this invention for enhancement of fluorescence should be at least the molar equivalent of the chelated terbium ion therein. A smaller amount, however, of Lewis base may be present.

As will be apparent to those skilled in the art in the light of the foregoing disclosure many modifications and substitutions are possible in the practice of this invention without departing from the spirit or scope thereof.

We claim:
1. A method of preparing a fluorescent composition which comprises dissolving terbium acetate and salicylic acid in an amine hardener and admixing therewith an epoxy resin to produce a hardened, fluorescent terbium chelate-containing epoxy resin wherein the ligand portion of the terbium chelate is derivable from salicylic acid.

2. A method of preparing a fluorescent composition which comprises dissolving terbium acetate and salicylic acid in dimethylsulfoxide, adding thereto a resin blend containing synthetic rubber and a thermosetting resin and heating the resulting admixture for a period of time to effect the polymerization of said resin blend.

References Cited

UNITED STATES PATENTS

| | | | |
|---|---|---|---|
| 3,214,382 | 10/1965 | Windsor | 252—301.2 |
| 3,225,307 | 12/1965 | Weissman | 252—301.2 |

FOREIGN PATENTS

| | | |
|---|---|---|
| 1,344,970 | 10/1963 | France. |
| 1,015,057 | 12/1965 | Great Britain. |

OTHER REFERENCES

Halverson et al.; Photoluminescence of Lanthanide Complexes, II. Enhancement by an Insulating Sheath, Journal of Chemical Physics, vol. 41, No. 1, July 1, 1964, pages 157–163.

Chemical Abstracts, vol. 59, December 1963, 12,759a.

Chemical Abstracts, vol. 59, 9, 566d.

DeMent: Fluorochemistry, 1945, pages 200–201.

Kroger: Some Aspects of the Luminescence of Solids, 1948, page 297.

TOBIAS E. LEVOW, *Primary Examiner.*

ROBERT D. EDMONDS, *Assistant Examiner.*